United States Patent
Maruhashi et al.

(10) Patent No.: US 9,824,157 B2
(45) Date of Patent: Nov. 21, 2017

(54) INFORMATION PROCESSING DEVICE AND INFORMATION PROCESSING METHOD

(71) Applicant: FUJITSU LIMITED, Kawasaki-shi, Kanagawa (JP)

(72) Inventors: Koji Maruhashi, Hachioji (JP); Nobuhiro Yugami, Minato (JP)

(73) Assignee: FUJITSU LIMITED, Kawasaki (JP)

( * ) Notice: Subject to any disclaimer, the term of this patent is extended or adjusted under 35 U.S.C. 154(b) by 415 days.

(21) Appl. No.: 14/609,948

(22) Filed: Jan. 30, 2015

(65) Prior Publication Data
US 2015/0261757 A1    Sep. 17, 2015

(30) Foreign Application Priority Data
Mar. 17, 2014 (JP) ................. 2014-053371

(51) Int. Cl.
G06F 17/30    (2006.01)

(52) U.S. Cl.
CPC ...... *G06F 17/3089* (2013.01); *G06F 17/3053* (2013.01); *G06F 17/30386* (2013.01); *G06F 17/30864* (2013.01)

(58) Field of Classification Search
CPC .......... G06F 17/3089; G06F 17/30386; G06F 17/30864; G06F 17/3053
USPC .............................................. 707/723, 736
See application file for complete search history.

(56) References Cited

U.S. PATENT DOCUMENTS

| 5,905,814 | A | 5/1999 | Mochizuki et al. |
| 8,878,720 | B2* | 11/2014 | Ono ........ G01S 19/07 342/357.23 |
| 2002/0087540 | A1* | 7/2002 | Ashida ...... G06F 17/30289 707/E17.005 |
| 2002/0091908 | A1* | 7/2002 | Ashida ...... G06F 17/30289 712/1 |

(Continued)

FOREIGN PATENT DOCUMENTS

| JP | 2005-244436 | 9/2005 |
| JP | 2006-48253 | 2/2006 |

(Continued)

OTHER PUBLICATIONS

Weng-Keen Wong et al., "Rule-Based Anomaly Pattern Detection for Detecting Disease Outbreaks", AAAI-02 Proceedings, pp. 217-223, 2002.

*Primary Examiner* — Phong H Nguyen
(74) *Attorney, Agent, or Firm* — Staas & Halsey LLP

(57) ABSTRACT

An information processing device including: a storage unit configured to store a first record set including variables of multiple types, and a second record set different from the first record set and including variables of the multiple types; and a processing unit configured to calculate an expected value at which a first variable set representing a combination of variables formed by selecting one variable for each type in the first record set is expected to appear in the second record set, extract the first variable set based on the expected value and the number of records including the first variable set in the second record set, and output at least one of the extracted first variable set and a second variable set, the second variable set representing a combination of variables formed by selecting one or more variables for each type in the second record set.

12 Claims, 10 Drawing Sheets

(56) References Cited

U.S. PATENT DOCUMENTS

| | | | | |
|---|---|---|---|---|
| 2008/0263663 | A1* | 10/2008 | Ide | G06F 17/30705 |
| | | | | 726/22 |
| 2011/0227786 | A1* | 9/2011 | Ono | G01S 19/07 |
| | | | | 342/357.23 |
| 2012/0326738 | A1* | 12/2012 | Kim | G01B 31/31837 |
| | | | | 324/750.01 |
| 2014/0289397 | A1* | 9/2014 | Dewagamage | H04L 41/0836 |
| | | | | 709/224 |

FOREIGN PATENT DOCUMENTS

| | | |
|---|---|---|
| JP | 2006-107179 | 4/2006 |
| JP | 2006-203937 | 8/2006 |
| JP | 2013-33363 | 2/2013 |

\* cited by examiner

FIG. 10

APPEARANCE RATIOS OF VARIABLE VALUES IN PAST RECORD SET

T51

| VARIABLE VALUE COMBINATION (VARIABLE SET) | EXPECTED VALUE |
|---|---|
| IP1 & U2 & A | 20,000 × 0.05 × 0.10 × 0.08 = 8.0 |
| IP2 & U2 & B | 20,000 × 0.08 × 0.10 × 0.03 = 4.8 |
| IP1 & U1 & B | 20,000 × 0.05 × 0.30 × 0.03 = 9.0 |
| ⋮ | ⋮ |

T61

| VARIABLE VALUE COMBINATION (VARIABLE SET) | NUMBER OF APPEARANCES | DIFFERENCE FROM EXPECTED VALUE | SQUARE VALUE |
|---|---|---|---|
| IP1 & U2 & A | 4 | −4.0 | 16 |
| IP2 & U2 & B | 6 | +1.2 | 1.44 |
| IP1 & U1 & B | 0 | −9.0 | 81 |
| IP1 & U1 & C | 1 | −1.0 | 1 |
| ⋮ | ⋮ | ⋮ | ⋮ |

T71

| IP | INSTABILITY |
|---|---|
| IP1 | 9.9 |
| IP2 | 2.3 |
| ⋮ | ⋮ |

T72

| URL | INSTABILITY |
|---|---|
| U1 | 6.8 |
| U2 | 9.0 |
| ⋮ | ⋮ |

T73

| USER | INSTABILITY |
|---|---|
| A | 3.1 |
| B | 5.1 |
| ⋮ | ⋮ |

T81

| VARIABLE VALUE COMBINATION (VARIABLE SET) | PREDETERMINED THRESHOLD |
|---|---|
| IP1 & U2 & A | $10{,}000 \times 9.9 \times 9.0 \times 3.1 \times 10^{-6} = 2.8$ |
| IP2 & U2 & B | $10{,}000 \times 2.3 \times 9.0 \times 5.1 \times 10^{-6} = 1.1$ |
| IP1 & U1 & B | $10{,}000 \times 9.9 \times 6.8 \times 5.1 \times 10^{-6} = 3.4$ |
| ⋮ | ⋮ |

INFORMATION PROCESSING DEVICE AND INFORMATION PROCESSING METHOD

CROSS-REFERENCE TO RELATED APPLICATION

This application is based upon and claims the benefit of priority of the prior Japanese Patent Application No. 2014-053371 filed on Mar. 17, 2014, the entire contents of which are incorporated herein by reference.

FIELD

The present embodiments relate to an information processing device, a medium in which a program is recorded, and an information processing method.

BACKGROUND

There has been proposed a method that detects a predetermined event based on a set of records (often referred to as logs) including variables of multiple types acquired from a monitoring target.

The monitoring target is, for example, a web server, and the record is, for example, an access log of the web server. The access log includes, for example, time and date of access, an access source Internet Protocol (IP) address, and an access destination uniform resource locator (URL). The predetermined event is an abnormal event such as an unauthorized access.

Related technologies are disclosed in Japanese Laid-open Patent Publications No. 2006-48253 and No. 2006-107179.

Weng-Keen Wong, Andrew W. Moore, Gregory F. Cooper, Michael M. Wagner: Rule-Based Anomaly Pattern Detection for Detecting Disease Outbreaks. AAAI/IAAI 2002: 217-223 is also an example of related art.

The detection method mentioned above includes, for example, a method which detects a predetermined event as an event detection target based on a result of comparison between current and past records. However, such records include various records not related to the predetermined event of the detection target (referred to as a noise-induced record, as appropriate).

Accordingly, in the detection method described above, false detection may occur due to a noise-induced record. Here, records to be compared may be either or both of current records and past records, and comparison may be made between current records, for example.

An aspect of the present embodiment has an object to inhibit false detection when detecting a predetermined event based on records acquired from a monitoring target.

SUMMARY

According to an aspect of the invention, an information processing device includes: a storage unit configured to store a first record set including variables of multiple types, and a second record set different from the first record set and including variables of the multiple types; and a processing unit configured to calculate an expected value at which a first variable set representing a combination of variables formed by selecting one variable for each type in the first record set is expected to appear in the second record set, extract the first variable set based on the expected value and the number of records including the first variable set in the second record set, and output at least one of the extracted first variable set and a second variable set, the second variable set representing a combination of variables formed by selecting one or more variables for each type in the second record set.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram for specifically illustrating a process of calculating a threshold for a first variable set.

DESCRIPTION OF EMBODIMENTS

Method for Detecting Predetermined Event

A method for detecting a predetermined event related to the present embodiment is described with reference to FIG. 1 and FIG. 2. Here, the predetermined event means, for example, an abnormal event.

Figure 1:
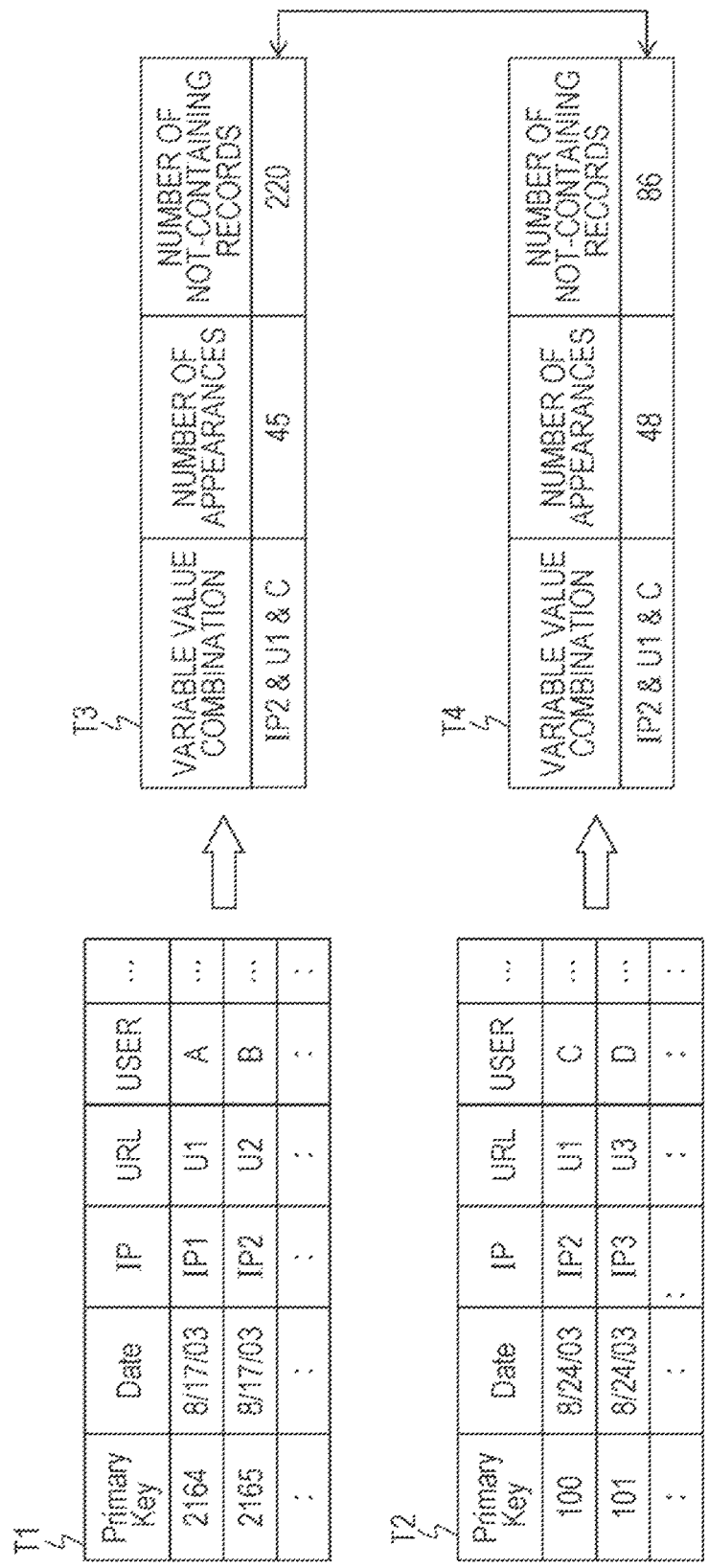
FIG. 1 is a diagram for illustrating a method for detecting an abnormal event.

FIG. 1 is a diagram for illustrating a method for detecting an abnormal event. A past record set T1 is a table for storing multiple past records (hereinafter referred to as a past record set, as appropriate). A current record set T2 is a table for storing multiple current records (hereinafter referred to as a current record set, as appropriate). These records are records which a monitoring device has acquired from a monitoring target, the records being, for example, access logs of a web server. The web server is, for example, a server for electronic commerce or news site. Hereinafter, " . . . " means omission of description.

The following tables for storing a record store one record in one line. A past record set T1 illustrating a table for storing a past record set, and a current record set T2 illustrating a table for storing a current record set respectively include a PrimaryKey field, a Date field, an IP field, a URL field, and a User field.

The PrimaryKey field stores an identifier for identifying one record. The Date field stores time and date when the record is generated. For convenience of illustrating in the figure, year is omitted, and time is shown in hour only. The Date field indicates month/day/time in the MM/DD/HH format, in which MM represents a month, DD represents a day, and HH represents a time.

The IP field stores an access source IP address contained in the record. Hereinafter, in figures, an IP address having a different value is shown by any one of IP1 to IPm (m represents an integer of 2 or larger).

The URL field stores the access destination URL contained in the record. Hereinafter, in figures, an URL having a different value is shown by any one of U1 to Un (n represents an integer of 2 or larger).

The User field stores information uniquely identifying the user who has accessed the web server. Hereinafter, in figures, a different user is shown by an alphabetical character (A, B, C, D . . . ).

Specific Method for Detecting Abnormal Event

A method uses the following first to eight steps. At a first step, a value of a variable for each type (hereinafter, a value of a variable is referred to as a variable value, as appropriate) is combined for all records in the past record set T1 and the current record set T2.

In the example of FIG. 1, as a variable value, for example, the IP address "IP2", the URL "U1", and the User "C" are combined together. An example of this combination is shown as "IP2&U1&C" in the "VARIABLE VALUE COMBINATION" field of the combination table T3 and the combination table T4 of FIG. 1.

At a second step, the number of records satisfying this combination of "IP2&U1&C" in the past record set T1 illustrated in FIG. 1 is counted and stored in the "NUMBER OF APPEARANCES" field of the combination table T3 of FIG. 1. Assume that the counted number is, for example, "45".

At a third step, the total number of variable value combinations selected on one-valuable-value to one-type basis not including the above combination of "IP2&U1&C" is subtracted from the total number of records in the past record set T1 (for example, 265), and stored in the "NUMBER OF NOT-CONTAINING RECORDS" field of the combination table 13 of FIG. 1. Assume that the stored total number is, for example "220".

At a fourth step, a ratio (hereinafter, referred to as a first ratio) of the number of records satisfying (applicable to) the combination of "IP2&U1&C" with respect to the total stored number (for example, 220) is calculated. The first ratio is "45/220".

Next, the method implements the above second to fourth steps for the current record set T2 illustrated in FIG. 1. Specifically, fifth to seventh steps are implemented.

At a fifth step, in the current record set T2 illustrated in FIG. 1, the number of records satisfying the combination of "IP2&U1&C" described at the second step is counted and stored in the "NUMBER OF APPEARANCES" field of the combination table T4 of FIG. 1. Assume that the counted number is, for example, "48".

At a sixth step, the total number of variable value combinations selected on one-variable-value to one-type basis not containing the above combination of "IP2&U1&C" is subtracted from the total number of records in the current record set T2 (for example, 134), and stored in the "NUMBER OF NOT-CONTAINING RECORDS" field of the combination table T4 of FIG. 1. Assume that the stored total number is, for example "86".

At a seventh step, a ratio of the number of records satisfying (applicable to) this combination of "IP28&U1&C" with respect to the total stored number (for example, 86) is calculated (hereafter, referred to as a second ratio). The second ratio is "48/86".

At an eighth step, it is determined (or verified) whether there is a significant difference between the first ratio and the second ratio. If the first ratio and the second ratio are different significantly from each other, the above combination is outputted as an abnormal set, and the administrator is prompted to take an appropriate action. For example, Fischer's exact test is used to determine whether the first ratio and the second ratio are significantly different from each other.

In the method, combining a variable value of a different type described at the first step is performed in a comprehensive manner. That is, all combinations are prepared. Then, second to eighth steps are implemented for each of the combinations.

According to the method, when noise-induced records are contained in numerous records targeted for abnormal event detection, false detection may occur frequently due to the noise-induced records. Noise-induced records include various records not related to an abnormal event.

Here, the noise-induced record is described specifically. For example, assume that access destination URLs "U1" to "U5" (not shown) are URLs related to electronic commerce. Then, assume that the host of the electronic commerce gives the user a commodity discount point (or referred to as a coupon) according to the number of access to the URL. However, when the user makes access to the URL just for getting the discount point but not for the main purpose of commodity purchasing or commodity viewing (corresponding to the window shopping at a real store), the user is regarded as an ill-intentioned user, and therefore, not given the point. The host of the electronic commerce has to detect access by an ill-intentioned user in order to inhibits giving of the point to such user.

Figure 2:
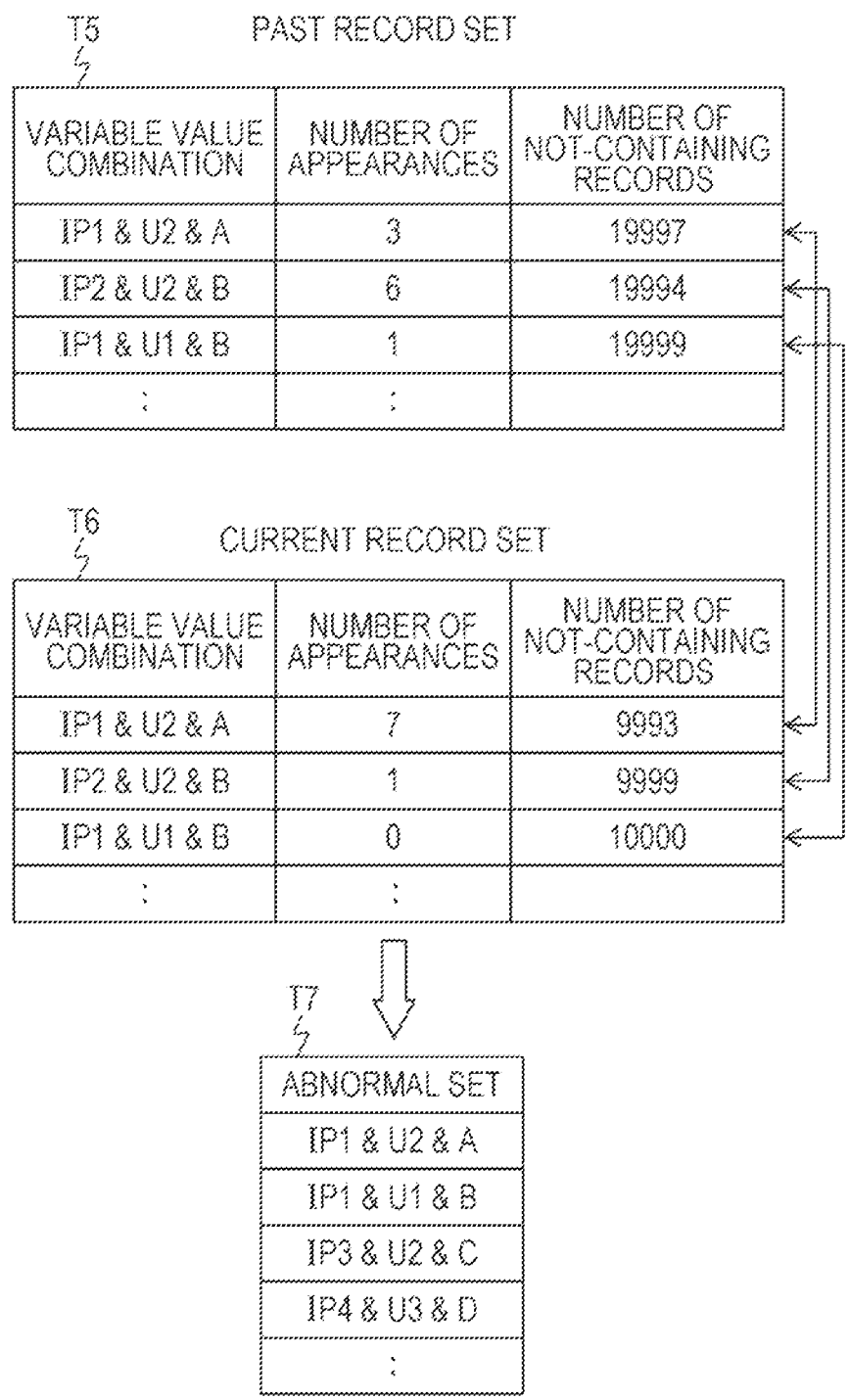
FIG. 2 is a diagram or illustrating a problem with a method for detecting an abnormal event.

Here, assume records containing the transmission source IP address "IP2", the access destination URL "U1" and the user "C" (combination of "IP28&U1&C") in the past record set (for example, see T1 of FIG. 1) and the current record set (for example, see T2 of FIG. 2). Hereinafter, this record is referred to as an assumed record, as appropriate.

The first ratio of the assumed record is "45/220" (0.20) in the example of FIG. 1, and the second ratio of the assumed record is "48/86" (0.56). Since the second ratio is more than 2 times the first ratio, the method determines that the first ratio and the second ratio are significantly different from each other.

Then, the method outputs this combination as an abnormal set. Specifically, the method notifies the administrator that access to the URL "U1" by the user "C" (transmission source IP address "IP2") is abnormal, and prompts the administrator to take an appropriate action. The abnormal means that the user "C" is an ill-intentioned user.

Here, assume that the user "C" is unable to access to the URL "U1." properly due to some reason when attempting to access to the URL "U1" at the time and date of the current record set. This is, for example, the case where although having made access to the URL "U1", the user "C" could not fully download HTML data of the URL "U1" to the user's device, and therefore, images are not fully displayed.

This is due to, for example, a failure of the browser run by the device of the user "C", a network delay between the user's device and a web server storing HTML data of the URL "U1", or overload of the web server.

When the user "C" is unable to access to the URL "U1" properly like this case, the user "C" repeats access to the URL "U1" until the URL can be accessed properly. As a result, the number of assumed records in the current record set increases. Those records are not records caused by an ill-intentioned user, that is, records not related to an abnormal event (in other words, noise-induced records).

In such a case where records of the detection target (that is, current records) contain noise-induced records, false detection due to the noise-induced records may occur frequently. Hereinafter, this problem is described with reference to FIG. 2.

FIG. 2 is a diagram for illustrating a problem with a method of detecting an abnormal event. A combination table T5 and a combination table T6 of FIG. 2 include the same configuration as the combination table T3 and the combination table T4 of FIG. 1. In the illustration of FIG. 2, the total number of records in the past record set is 20,000, and the total number of records in the current record set is 10,000.

The method combines variable values of all the types by performing the first step. In the example of FIG. 2, for example, the IP address "IP1", the URL "U2", and the User "A" are combined as variable values. This combination example is shown as "IP1&U2&A" in the "variable value combination" field of the combination table T5 and the combination table T6 of FIG. 2.

The method implements the second and third steps for the past record set. Then, the method implements the fourth step to calculate a first ratio corresponding to a certain combination (for example, "IP1&U2&A"). The first ratio is (for example, 3/19997). A portion of the implementation result of this step is shown in the combination table T5 of FIG. 2. Hereinafter, the certain combination is referred to as a combination X.

Further, the method implements the fifth and sixth steps for the current record set. Then, the method implements the seventh step to calculate a second ratio corresponding to the combination described at the fourth step (for example, "IP1&U2&A"). The second ratio is (for example, 7/9993). A portion of the implementation result of this step is shown in the combination table T6 of FIG. 2.

In FIG. 2, each pair of same combinations in the past record set and the current record set is shown with an arrow.

Here, in FIG. 2, if many types of variable values are combined, a very small number of records satisfy the combination X. For example, in the combination table 15, the number of records satisfying the combination X (for example, "IP1&U2&A") is 3. In the combination table T6, the number of records satisfying the combination X is 7.

When the number of records satisfying the combination X is very small, the method determines for the combination X whether the first ratio described at the fourth step and the second ratio described at the seventh step are significantly different from each other.

In the past record set and the current record set, it is difficult to previously determine whether each of multiple records satisfying the combination X is a noise-induced record or a record not induced by noise. Therefore, it is determined whether the first ratio and the second ratio calculated from the past and current record sets including noise-induced records are significantly different from each other.

Assume a case where there are many records satisfying the combination X (for example, "100" records in the past record set, and "200" records in the current record set). In this case, if a small number of noise-induced records (for example, "2" records) are included in multiple records satisfying the combination X, an effect thereof on the first ratio or the second ratio is negligibly small.

Here, assume a case where there are a small number of records satisfying the combination X (for example, "3" records in the past record set, and "7" records in the current record set). In this case, if a noise-induced record is included in multiple records satisfying the combination X, an effect thereof on the first ratio or the second ratio is significant. Consequently, because of the noise-induced record, it may be determined that the first ratio and the second ratio are significantly different from each other in the combination X, and thereby, it may be detected that an abnormal event has occurred. In fact, however, this detection is a false detection due to the noise-induced record.

Based on the predetermined event detection method described above, an information processing device for performing processing of inhibiting false detection when detecting an abnormal event is described according to the following embodiment.

Embodiment

Information Processing System

Figure 3:
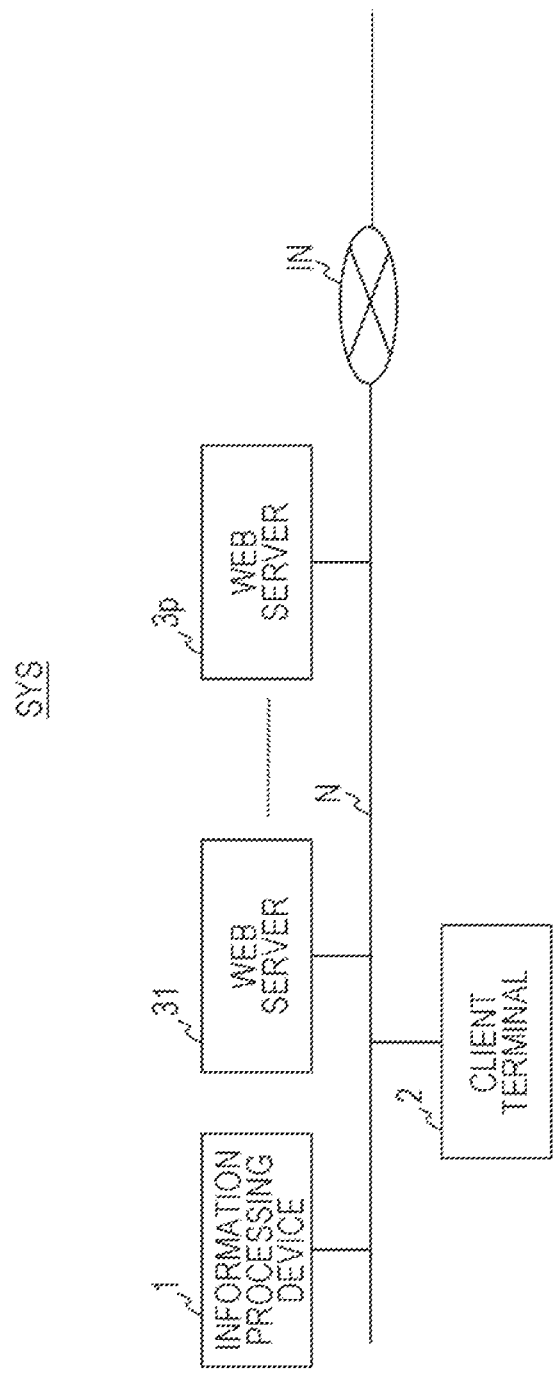
FIG. 3 is an example of a diagram for illustrating an information processing system SYS according to the present embodiment.

FIG. 3 is an example of a diagram for illustrating an information processing system SYS according to this embodiment. In the description below, similar components are assigned similar reference numerals, and thereby description of similar components is omitted, as appropriate.

The information processing system SYS includes an information processing device 1 connected via a network N such as local area network (LAN) and wide area network (WAN), a client terminal 2, and web servers 31 to 3p (small letter p represents an integer of 2 or larger).

The information processing device 1 is a device configured to detect a predetermined event based on a set of records containing variables of multiple types acquired from a monitoring target (for example, web server 31 to web server 3p). The information processing device 1 is also referred to as an abnormality detection device. The client terminal 2 is a terminal configured to operate the information processing device 1.

Web servers 31 to 3p (p represents an integer of 2 or larger) are servers configured to perform Hypertext Transfer Protocol (HTTP) communication with a browser installed on an external terminal (not shown) connected via an Internet IN to perform a predetermined information processing. Any of web servers 31 to 3p (such as, for example, web servers 31 and 32) is a server which performs, for example, electronic transactions illustrated in FIG. 1 and FIG. 2. Upon receiving an access request from an external terminal used by an electronic transaction user, any of web servers 31 to 3p prompts the user to enter a user identifier (user ID) and a user password.

Any of web servers 31 to 3p authenticates the user based on the entered user ID and user passport, and if the authentication is successful, authorizes access to the server by the user.

Any of web servers 31 to 3p generates an access log (record) illustrated in FIG. 1 and outputs to the information processing device 1. The record contains an identifier of the record, time and date when the record is generated, an access source (external terminal) IP address, an access destination URL, and a user ID.

Hardware Block Diagram of Information Processing Device

Figure 4:
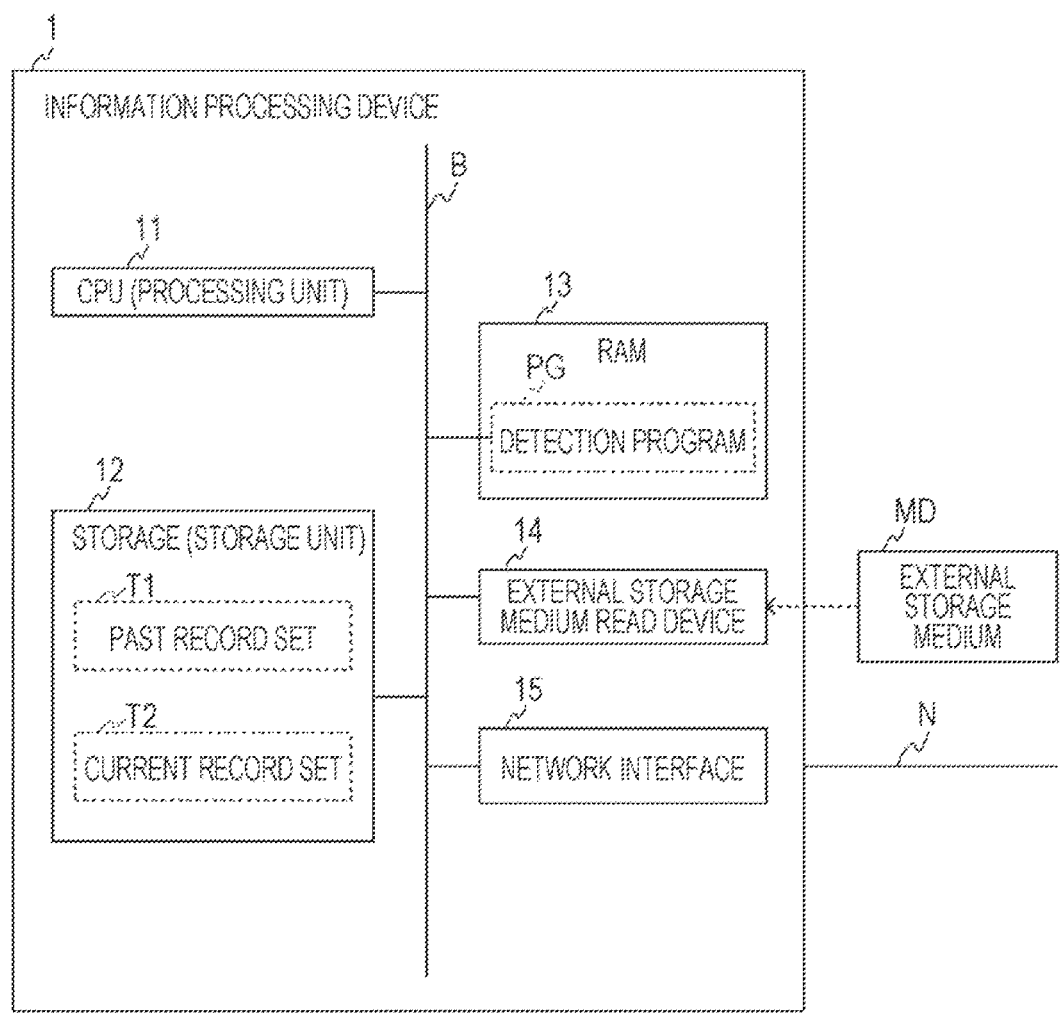
FIG. 4 is an example of a block diagram for illustrating a hardware configuration of the information processing device 1 of FIG. 3.

FIG. 4 is an example of a block diagram for illustrating a hardware configuration of the information processing device 1 of FIG. 3.

The information processing device 1 includes a processing unit (CPU) 11 connected to a bus B, storage device (storage unit) 12, a RAM 13, an external storage medium read device 14, and a network interface device 15. The CPU is the abbreviation of "central processing unit", and the RAM is the abbreviation of "random access memory". Hereinafter, the processing unit (CPU) 11 is referred to as a CPU 11, and the storage (storage unit) 12 is referred to as a storage 12, as appropriate.

The CPU 11 is a central processing unit (computer) configured to control the entire information processing device 1. The storage 12 is a mass storage device such as, for example, a hard disk drive (HDD) and a solid state drive (SSD). The storage 12 stores the past record set T1, the current record set T2, and an execution file of a detection program PG for detecting a predetermined event (for example, an abnormal event).

The past record set T1 is a first record set containing variables of multiple types, such as, for example, a past record set T1 of FIG. 1. The current record set T2 is a second record set different from the past record set T1 and containing variables of multiple types, such as, for example, a current record set T2 of FIG. 1.

The RAM 13 temporarily stores data generated (calculated) in processing executed by the CPU 11, and at steps implemented by the detection program PG. The RAM 13 is a semiconductor memory such as, for example, a dynamic random access memory (DRAM). The RAM 13 may be a storage unit for storing the past record set T1 and the current record set T2.

When the information processing device 1 is activated, the CPU 11 reads the execution file of the detection program PG from the storage 12, runs in the RAM 13, and performs process of detecting an abnormal event. The execution file may be stored in an external storage medium MD.

The external storage medium read device 14 is a device configured to read data stored in the external storage medium MD. The external storage medium MD is, for example, a portable storage medium such as a compact disc read only memory (CD-ROM) and a digital versatile disc (DVD), or a portable non-volatile memory such as a USB memory.

The network interface 15 includes, for example, a network interface card (NIC), and provides an interface function to the network N.

Software Block Diagram of Information Processing Device

Figure 5:
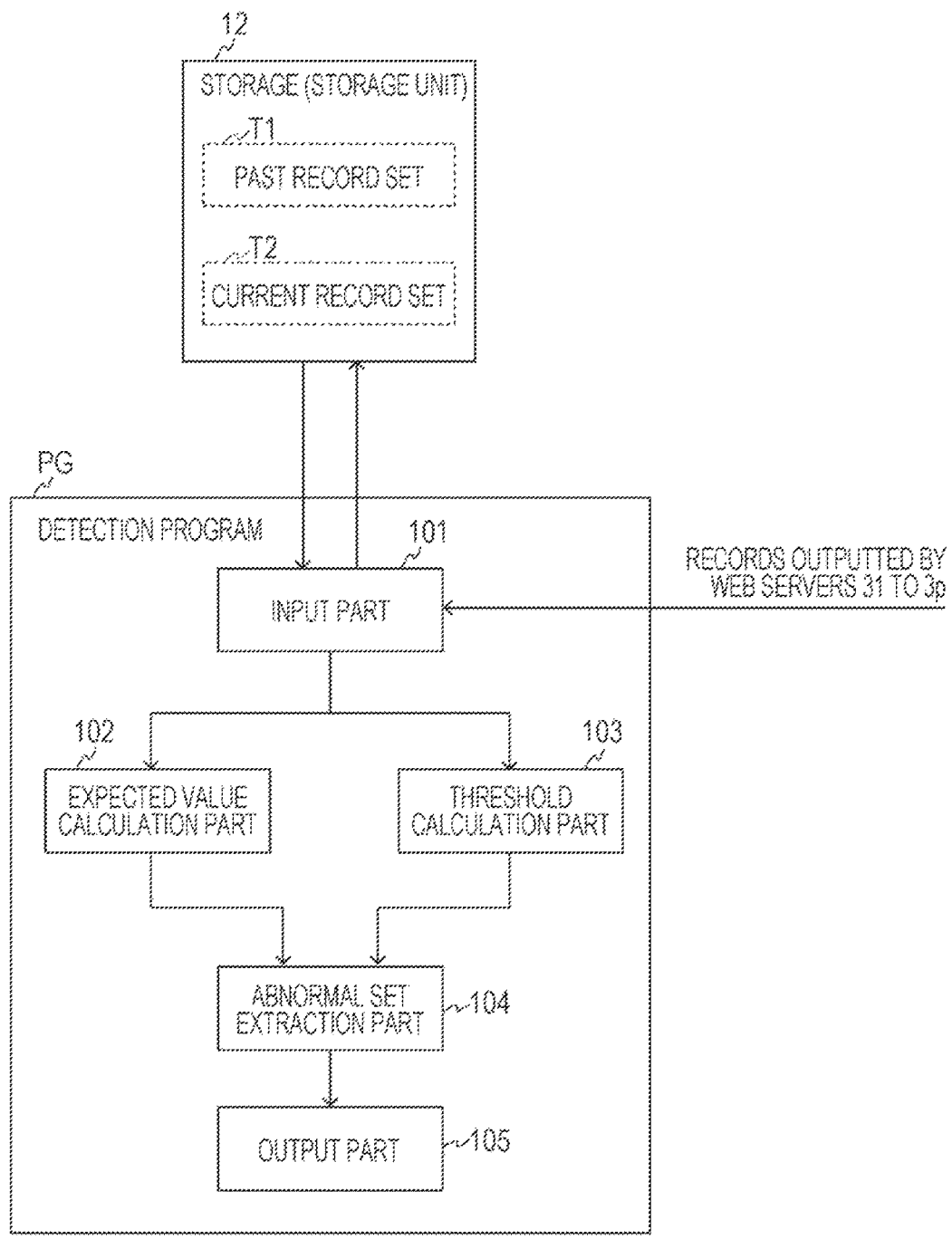
FIG. 5 is an example of a block diagram for illustrating a software configuration of the information processing device 1 of FIG. 4.

FIG. 5 is an example of a block diagram for illustrating a hardware configuration of the information processing device 1 of FIG. 4. The detection program PG includes an input part 101, an expected value calculation part 102, a threshold calculation part 103, an abnormal set extraction part 104, and an output part 105.

The input part 101 is configured to acquire a record (access log) outputted by web servers 31 to 3p, refer to time and date contained in the acquired record, and sort the acquired record into the past record set or the current record set. For example, based on the time and date (for example, 10:00 of January 22) when abnormal event detection processing is performed, the input part 101 sorts multiple records generated in a predetermined time slot (from 07:00 to 13:00) into the current record set, and stores in the storage 12 (see the current record set T2).

Then, the input part 101 sorts multiple records generated from the time and date (for example, 10:00 of January 22) when abnormal event detection processing is performed back to the above predetermined time slot (from 07:00 to 13:00) of a predetermined preceding day (for example 1 day) into the past record set, and stores in the storage 12 (see the past record set T1).

The input part 101 reads the past record set T1 and the current record set T2 from the storage 12, and inputs to the expected value calculation part 102 and the threshold calculation part 103.

The expected value calculation part 102 calculates an expected value at which a first variable set representing a combination of variable values formed by selecting one variable value for each type (also referred to as "a combination on one-variable-value to one-type basis" below) in the past record set T1 appears in the current record set T2.

The threshold calculation part 103 calculates a threshold for the first variable set, based on an expected value at which the first variable set appears in the past record set T1, and the number of records containing the first variable set in the current record set T2.

The abnormal set extraction part 104 determines whether to extract the first variable set, based on the threshold of the first variable set, and the number of records containing the first variable set in the current record set T2, and extracts the first variable set based on the determination result.

The output part 105 outputs at least one of a second variable set and the extracted first variable set, based on the extracted first variable set and the second variable set. Here, the second variable set represents a combination of variable values formed by selecting one or more variable values for each type (also referred to as "a combination on one-or-more-variable-values to one-type basis" below) in the current record set T2. Specifically, the output part 105 outputs at least one of the second variable set and the extracted first variable set, based on the extracted first variable set, and a third variable set representing the combination on one-variable-value to one-type basis in the second variable set. The output part 105 notifies to the administrator by the above output that an event of the detection target has occurred.

Flow of Abnormal Event Detection Processing

Figure 6:
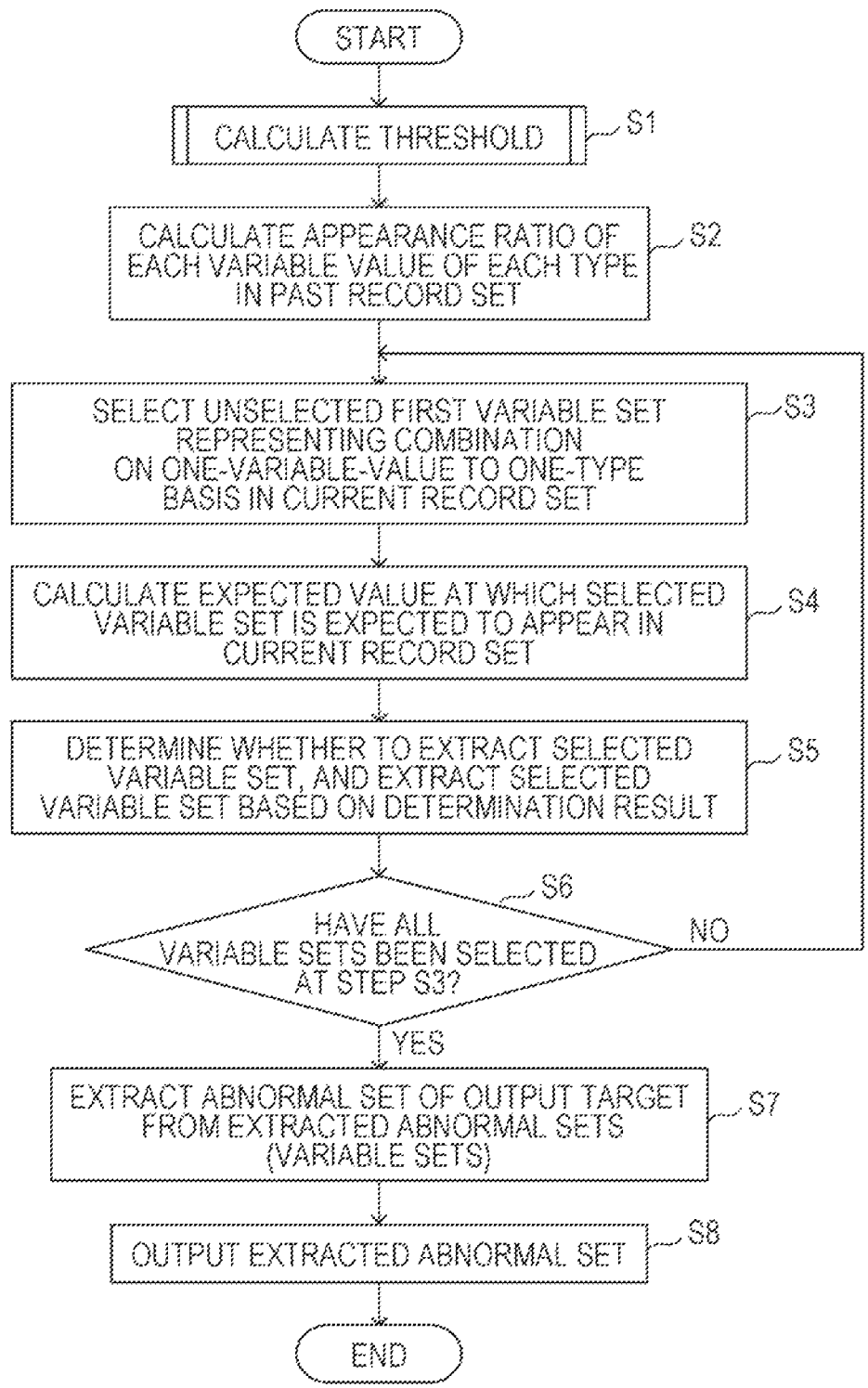
FIG. 6 is a flowchart for illustrating a flow of detection process of a predetermined event (for example, an abnormal event)

FIG. 6 is a flowchart for illustrating a flow of a predetermined event (for example, an abnormal event) detection process. Prior to execution of the below step S1, the input part 101 of the information processing device 1 reads the past record set T1 and the current record set T2 from the storage 12, and inputs to the expected value calculation part 102 and the threshold calculation part 103.

Step S1: The threshold calculation part 103 calculates a threshold for the first variable set representing the combination on one-variable-value to one-type basis in the past record set T1. Processing of step S1 is illustrated in detail in FIG. 9.

Step S2: The expected value calculation part 102 calculates an appearance ratio (or referred to as an occurrence probability or an appearance probability) indicating a ratio at which each of variable values for each type in the past record set T1 appears. Processing of steps S2 to S4 is illustrated specifically in FIG. 7.

Step S3: The threshold calculation part 102 selects an unselected first variable set representing the combination on one-variable-value to one-type basis in the current record set T2.

Step S4: The expected value calculation part 102 calculates an expected value at which the selected variable set appears in the current record set T2.

Step S5: The abnormal set extraction part 104 determines whether to extract the selected variable set, based on the expected value of the selected variable set, and the number of records containing the selected variable set in the current record set T2, and extracts the selected variable set as an abnormal set based on the determination result. Processing of steps S5 to S8 is illustrated specifically in FIG. 8.

Step S6: The abnormal set extraction part 104 determines whether all variable sets have been selected at step S3. If all variable sets have not been selected (Step S6: No), the process returns to step S3. If all variable sets have been selected (Step S6: Yes), the process shifts to step S7.

Step S7: The output part 105 extracts an abnormal set of the output target out of the abnormal set (variable set) extracted at step S5.

Step S8: The output part 105 outputs the abnormal set extracted at step S7. The output method includes, for example, the one using display output. When the display output is used, the output part 105 outputs the abnormal set to a display device of the client terminal 2 of FIG. 3.

Specific Example of Abnormal Event Detection Processing

Figure 7:
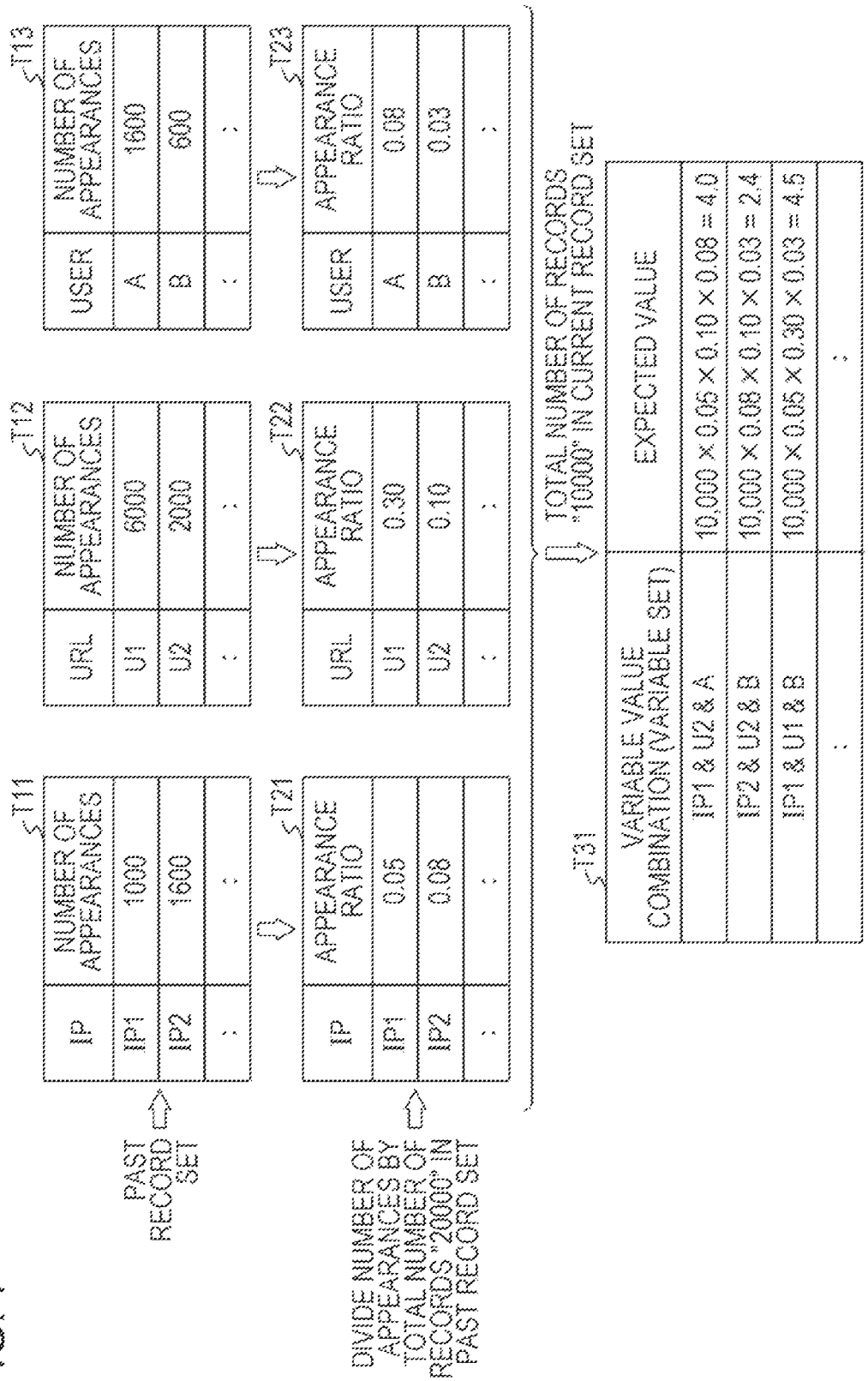
FIG. 7 is a diagram for illustrating calculation of an expected value.
Figure 8:
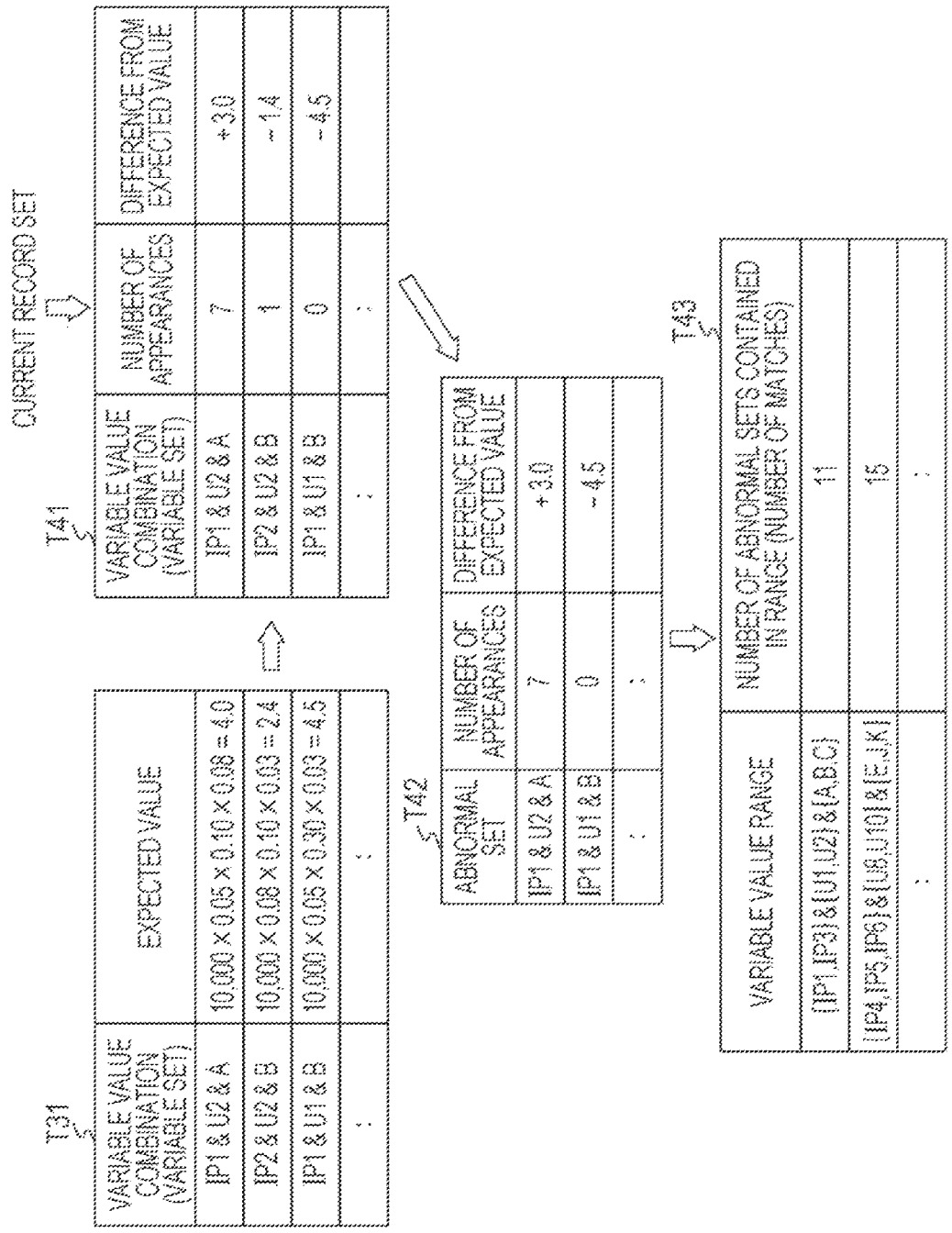
FIG. 8 is a diagram for illustrating output of an abnormal set.

Abnormal event detection processing is described specifically with reference to FIG. 1 and FIG. 6 to FIG. 8. FIG. 7 is a diagram for illustrating calculation of the expected value. FIG. 8 is a diagram for illustrating output of the abnormal set. Here, the threshold described at step S1 of FIG. 6 has been calculated.

Calculation of Appearance Ratio

Calculation of the appearance ratio (step S2 of FIG. 6) is described. Firstly, the expected value calculation part 102 calculates the total number (for example, 20,000) of records of the past record set T1. The expected value calculation part 102 calculates the number of appearance (or referred to as an occurrence frequency) for each variable value of each type in all records (step S2). In other words, the expected value calculation part 102 calculates the number of records, among all records, containing a variable value across all and every variable values. The expected value calculation part 102 stores variable values, and the number of appearances of the variable values in the RAM 13, for example, in a table format.

An IP appearance number table T11 is a table for storing variable values (for example, IP1, IP2 . . . ), and number of appearances of such variable values when the variable type is the IP address. As an example of the IP appearance number table T11, the number of records containing the IP address "IP1" in the past record set T1 is 1,000.

The URL appearance number table T12 is a table for storing variable values (for example, U1, U2 . . . ), and number of appearances of such variable values when the variable type is the URL. As an example of the URL appearance number table T12, the number of records containing the URL "U1" in the past record set T1 is 6,000.

The user appearance number table T13 is a table for storing variable values (for example, A, B, . . . ), and number of appearances of such variable values when the variable type is the user. As an example of the user appearance number table T13, the number of records containing the user "A" in the past record set T1 is 1,600.

Next, the expected value calculation part 102 divides the number of appearances of each of variable values by the total number of records in the past record set T1, and calculates the divided value as the appearance ratio of each of variable values (step S2). The expected value calculation part 102 stores variable values, and the appearance ratio of each of the variable values in the RAM 13, for example, in a table format.

An IP appearance ratio table T21 is a table for storing variable values (for example, IP1, IP2 . . . ), and the appearance ratio of each of the variable values when the variable type is the IP address. As an example of the IP appearance ratio table T21, the expected value calculation part 102 calculates a value (0.05) obtained by dividing the number of appearances of the IP address "IP1" in the past record set T1 "1000" by the total number of records (20,000) in the past record set T1, as the appearance ratio of the IP address "IP1".

The URL appearance ratio table T22 is a table for storing variable values (for example, U1, U2 . . . ), and the appearance ratio of the variable values when the variable type is the URL. As an example of the URL appearance ratio table T22, the expected value calculation part 102 calculates a value (0.30) obtained by dividing the number of appearances "6000" of the URL "U1" in the past record set T1 by the total number of records (20,000) in the past record set T1, as the appearance ratio of the URL "U1".

The user appearance ratio table T23 is a table for storing variable values (for example, A, B . . . ), and the appearance ratio of the variable values when the variable type is the user. As an example of the user appearance ratio table T23, the expected value calculation part 102 calculates a value (0.08) obtained by dividing the number of appearances "1600" of the user "A" in the past record set T1 by the total number of records (20,000) in the past record set T1, as the appearance ratio of the user "A".

The threshold calculation part 102 selects a first variable set representing the combination on one-variable-value to one-type basis in the current record set T2, and stores in the RAM 13 (step S3).

For example, variable types are the IP address, URL and user. The expected value calculation part 102 selects any one of variable values (for example, IP1, IP2, . . . ) of the variable type "IP address" in the current record set T2. The expected value calculation part 102 selects any one of variable values (for example, U1, U2 . . . ) of the variable type "URL" in the current record set T2. The expected value calculation part 102 selects any one of variable values (for example, A, B . . . ) of the variable type "user" in the current record set T2.

Then, the expected value calculation part 102 combines variable values of the respective types to form a first variable set representing the combination on one-variable-value to one-type basis. Examples of the first variable set include "IP1, U2, A", "IP2, U2, B", and "IP1, U1, B". Hereinafter, the state of combined variable values is shown with "&" (product).

The expected value calculation part 102 stores the first variable set in the RAM 13, as shown in the current expected value table T31 of FIG. 7.

The expected value calculation part 102 implements the above combination for different variable values of each type in the current record set T2, and obtains all variable sets representing all combinations. For example, assume that in the current record set T2, there are two variable values IP1 and IP2 for the variable type "IP address", three variable values U1, U2 and U3 for the variable type "URL", and two variable values A and B for the variable value "user". In this case, all variable sets representing all combinations are 12(2×3×2) variable sets. The expected value calculation part 102 selects an unselected variable set out of all variable sets (step S3).

Calculation of Expected Value in Current Record Set T2

Next, calculation of the expected value in the current record set T2 (step S4 of FIG. 6) is described.

The expected value calculation part 102 calculates an expected value of the variable set selected at step S3, based on the total number of records in the current record set T2, and the appearance ratios of variable values of the respective types contained in the variable set (first variable set) selected at step S3 (step S4).

Specifically, the expected value calculation part 102 multiplies the appearance ratios of variable values of the respective types contained in the variable set (first variable set) selected at step S3, multiplies the multiplied value by the total number of records in the current record set T2, and stores in the RAM 13 (step S4). The expected value calculation part 102 uses the multiplied value stored in the RAM 13 as an expected value at which the selected variable set is expected to appear, that is, an expected value of the first variable set (step S4).

In the above example, the total number of records in the current record set T2 is "10,000". The selected variable set is, for example, "IP1&U2&A". The appearance ratio of one variable value "IP1" of the type "IP address" in the variable set "IP1&U2&A" is "0.05" (see the IP appearance ratio table T21 of FIG. 7). The appearance ratio of one variable value "U2" of the type "URL" in the variable set "IP1&U2&A" is "0.1.0" (see the URL appearance ratio table T22 of FIG. 7). The appearance ratio of one variable value "A" of the type "user" in the variable set "IP1&U2&A" is "0.08" (see the user appearance ratio table T23 of FIG. 7).

The expected value calculation part 102 multiplies appearance ratios "0.05", "0.10", and "0.08" of the types "IP address", "URL", and "user" in the variable set "IP1&U2&A". The expected value calculation part 102 multiplies the multiplied value (0.0004) by the total number of records in the current record set T2 "10,000" to calculate out the multiplied value "4.0" (10000×0.0004(0.05×0.10×0.08)), and stores in the RAM 13.

The expected value calculation part 102 uses the multiplied value "4.0" as an expected value at which the variable set "IP1&U2&A" is expected to appear in the current record set T2.

The expected value calculation part 102 stores the variable set and the expected value for the variable set in association with each other in the RAM 13, as shown in the current expected value table T31 of FIG. 7.

Extraction of Abnormal Set

Extraction of the abnormal set (step S5 of FIG. 6) is described. The abnormal set extraction part 104 calculates the absolute value of the difference between the total number of records containing the variable set (first variable set) selected at step S3 in the current record set T2, and the expected value of the selected variable set, and stores the absolute value in the RAM 13. When the absolute value of the difference is larger than a threshold calculated in advance corresponding to the selected variable set, the abnormal set extraction part 104 extracts the selected variable set from the current record set T2, and stores as the abnormal set in the RAM 13 (step S5). The threshold is a threshold calculated in advance at step S1.

When the selected variable set is "IP1&U2&A", the expected value of the variable set is "4.0" according to the current expected value table T31 of FIG. 8. Assume that in the current record set T2, the number of records containing the selected variable set "IP1&U2&A" (IP address "IP1", URL "U2", and user "A") is "7". In this case, the abnormal set extraction part 104 calculates the above difference "+3.0" (7-4.0) for the selected variable set "IP1&U2&A".

As shown in the difference calculation table 141 of FIG. 8, the abnormal set extraction part 104 stores, in the RAM 13, the variable set, the number of records containing the variable set in the current record set T2, and a difference between the number of records and the expected value of the variable set in association with each other. In the difference calculation table T41, the number of records containing the above variable set in the current record set T2 is shown as the number of appearances.

The abnormal set extraction part 104 extracts the number of records containing the selected variable set, and the variable set as the abnormal set when the absolute value of the difference between the number of records and the expected value of the variable set is larger than a threshold for the variable set, and stores in the RAM 13.

For example, assume that the threshold for the variable set "IP1&U2&A" is "3", the threshold for the variable set "IP2&U2&B" is "2", and the threshold for the variable set "IP1&U1&B" is "4". In this case, the abnormal set extraction part 104 extracts the variable set "IP1&U2&A" and the variable set "IP1&U1&B" as the abnormal set in the example of the difference calculation table T41.

As shown in the abnormal set table T42, the abnormal set extraction part 104 stores, in the RAM 13, the variable set extracted as the abnormal set, the number of records (number of appearances) containing the variable set in the current record set T2, and a difference between the number of records and the expected value of the variable set in association with each other.

The expected value calculation part 102 and the abnormal set extraction part 104 repeat steps S3 to S5 until steps S3 to S5 have been completed for variable sets representing all combinations on one-variable-value to one-type basis in the current record set T2 (step S6: No). After this processing ends (step S6: Yes), the process shifts to step S7.

Output of Extracted Abnormal Set

Extraction (step S7 of FIG. 6) and output (step S8 of FIG. 6) of the abnormal set of the output target is described.

The output part 105 selects a second variable set representing a combination on one-or-more-variable-values to one-type basis, and stores in the RAM 13 (step S7). For the combinations on one-or-more-variable-values to one-type basis, assume that, for example, types are IP address, URL, and user, and variable values of each type are "IP1 to IP3" for the IP address, "U1" and "U2" for the URL, and "A" and "B" for the user. This example is referred to as a first case.

In the first case, the variable values selected on one-or-more-variable-values to one-type basis are as follows. For the IP address, there are [IP1], [IP2], [IP3], [IP1, IP3], [IP2, IP3], and [IP1, IP2, IP3] (seven different values). For the URL, there are [U1], [U2], [U1, U2] (three different values). For the user, there are [A], [B], and [A, B] (three different values).

In the first case, examples of the combinations on one-or-more-variable-values to one-type basis mentioned above include "[IP1]&[U1]&[A]", "[IP1]&[U2]&[A]", "[IP1]&[U1]&[B]", "[IP1]&[U2]&[B]", "[IP2]&[U1]&[A]", "[IP2]& [U2]&[A]" "[IP1]&[U1, U2]&[A]", "[IP1, IP2]& [U1, U2]&[A, B]", "[IP1, IP2]&[U1, U2]&[A]", "[IP1, IP2, IP3]&[U1, U2]&[A, B]", and so on. The sum of the combinations is 63(7×3×3).

The output part 105 calculates the total number of third variable sets representing the combination of one variable set for each type in the determined second variable set (step S7).

Combinations on one-variable-value to one-type basis for the first variable sets illustrated in FIG. 8, including, for example, "IP1&U2&A", "IP2&U2&B", and "IP1&U1&B" (see the difference calculation table T41 of FIG. 7).

In the first case, the third variable set representing the combination on one-variable-value to one-type basis in the determined second variable set "[IP1]&[U1.]&[A]" is, for example, "[IP1]&[U1]&[A]", and the total number thereof is 1.

In the first case, third variable sets in the determined second variable set "[IP1, IP2]&[U1, U2]&[A, B]" are, for example, "[IP1]&[U1]&[A]", "[IP1]&[U2]&[A]", "[IP2]& [U1]&[A]", "[IP2]&[U2][A]", "[IP1]&[U1]&[B]", "[IP1]& [U2]&[B]", "[IP2]&[U1]&[B]", and "[IP2]&[U2]&[B]". The total number of the third variable sets is 8(2×2×2).

Here, assume that variable sets representing the combination on one-variable-value to one-type basis extracted as the abnormal set at step S5 are "[IP1]&[U1]&[A]", "[IP1]& [U2]&[A]", "[IP2]&[U1]&[A]", "[IP2]&[U2]&[A]", "[IP1]& [U1]&[B]", "[IP1]&[U2]&[B]", and "[IP2]& [U1]& [B]". The total number of variable sets is 7.

Based on the total number of third variable sets contained in the second variable sets, and the number of variable sets matching with the extracted first variable sets among the third variable sets, the output part 105 determines whether to output at least one of the second variable sets, and the extracted abnormal set (extracted first variable sets) (step S8). Then, based on the determination result, the output part 105 outputs at least one of the second variable sets and the extracted abnormal sets (step S8).

Here, when a value obtained by dividing the number of matching variable sets by the total number of third variable sets is larger than a predetermined value, the output part 105 outputs at least one of the second variable sets and the extracted abnormal sets (step S8). The output part 105 may output only the second variable sets, or only the extracted abnormal sets, or both of the second variable sets and the extracted abnormal sets.

Specifically, the output part 105 calculates out the match count of variable sets matching a variable set extracted as an abnormal set among third variable sets contained in the second variable set, and stores in the RAM 13 (step S8).

As shown in the output target abnormal set table T43 of FIG. 8, the output part 105 stores, in the RAM 13, the second variable set representing the combinations on one-or-more-variable-values to one-type basis, and the match count of variable sets matching a variable set extracted as an abnormal set among third variable sets included in the second variable set, in association with each other. The second variable set representing the combinations on one-or-more-variable-values to one-type basis is the "RANGE OF VARIABLE VALUE" in the output target abnormal set table T43, and the match count is the "NUMBER OF ABNORMAL SETS INCLUDED IN RANGE" in the output target abnormal set table T43.

In the first case described above, for example of the determined second variable set "[IP1, IP2]&[U1, U2]&[A, B]", variable sets matching a variable set extracted as an abnormal set are seven variable sets mentioned above, and the match count is 7.

When the match count divided by the total number of third variable sets is larger than a predetermined value (for example, 0.8), the output part 105 outputs variable sets extracted as the abnormal set (step S8).

In the above example in the first case, the match count "7" divided by the total number of third variable sets "8" is "0.88". Accordingly, the output part 105 outputs "[IP1]& [U1]&[A]", "[IP1]&[U2]&[A]", "[IP2]&[U1]&[A]", "[IP2]&[U2]&[A]", "[IP1]&[U1]&[B]", "[IP1]&[U2]& [B]", and "[IP2]&[U1]&[B]", which are variable sets representing the combinations on one-variable-value to one-type basis and extracted as abnormal sets. The output part 105 may output the determined second variable set "[IP1, IP2]&[U1, U2]&[A, B]".

As the second case, assume that the determined second variable set is "[IP1, IP3]&[U1, U2]&[A, B, C]". Assume that first variable sets extracted as abnormal sets are "[IP1]& [U1]&[A]", "[IP1]&[U1]&[B]", "[IP2]8[U1]&[C]", "[IP1]& [U2]&[A]", "[IP1]&[U2]&[B]", "[IP1]&[U2]& [C]", "[IP3]&[U1]&[A]", "[IP3]&[U1.]&[B]", "[IP3]& [U1]&[C]", "[IP3]&[U2]&[A]", and "[IP3]&[U2]&[B]" (1.1 different variable sets).

In this case, the total number of third variable sets representing the combination on one-variable-value to one-type basis in the determined second variable set "[IP1, IP3]&[U1, U2]&[A, B,]" is 12(2×2×3). Specifically, the third variable sets are "[IP1]&[U1]&[A]", "[IP1]&[U1]& [B]", "[IP1.]&[U1]&[C]", "[IP1]&[U2]&[A]", "[IP1]& [U2]&[B]", "[IP1]&[U2]&[C]", "[IP3]&[U1]&[A]", "[IP3]& [U1]&[B]", "[IP3]&[U1]&[C]", "[IP3]&[U2]& [A]", "[IP3]&[U2]&[B]", and "[IP3]&[U2]&[C]".

Then, among third variable sets, the match count of variable sets matching the first variable set extracted as the abnormal set is 11.

The match count "11" divided by the total number of third variable sets "12" is "0.92", which is larger than the predetermined value (for example, 0.8). Consequently, the output part 105 outputs at least one of the determined second variable set and the abnormal set.

When there are two or more second variable sets of the output target at step S8, the output part 105 may output the second variable sets, for example, in the descending order of the match counts corresponding to the second variable sets. For example, assume that three variable sets including the second variable set X, the second variable set Y, and the second variable set Z are outputted at step S8. Then, assume that match counts corresponding to the second variable set X, the second variable set Y, and the second variable set Z are 30, 20, and 10 respectively. In this case, the output part 105 outputs the second variable set X, the second variable set Y, and the second variable set Z in this order.

Reason for performing extraction (step S7 of FIG. 6) and output (step S8 of FIG. 6) of the abnormal set of the output target is described.

Abnormal sets caused by a predetermined event of the detection target (for example, abnormal event) may often form a group including variable values similar with each other. For example, assume an electronic transaction which gives points to the user according to the number of accesses illustrated in FIG. 2. Assume that the URLs identifying the site of the electronic transaction are, for example, U1 and U2. In this case, an ill-intentioned user attempts to frequently access to these URLs to acquire points corresponding to the number of accesses. Usually, the ill-intentioned user is a specific user (for example, users A, B, and C).

Therefore, variable sets of the abnormal set include variable sets including any one of the URLs U1 and U2, any one of the users A, B, and C, and a transmission source IP address. In this case, assume, for example, that users A, B, and C access to U1 and U2 just to get points. In this case, for example, the abnormal set forms similar variable sets containing the URL U1 or U2, and the user A, B, or C, such as [IP1&U1&A], [IP1&U2&A], [IP1&U1&B], [IP1&U2&B], [IP1&U1&C], [IP1&U2&C].

However, unlike a non-noise-induced abnormal set (in other words, an abnormal set related to an access by an ill-intentioned user), a noise-induced abnormal set (in other words, an abnormal set not related to an access by an ill-intentioned user) seldom forms similar variable sets. In other words, a noise-induced abnormal set usually appears in a random manner.

That is, similarity among variables in each of non-noise-induced abnormal sets can be regarded higher than similarity among variables in noise-induced abnormal sets. Therefore, when detecting an abnormal event, false detection of the abnormal event can be inhibited by inhibiting output of a noise-induced abnormal set.

In view of the foregoing, the inventor found that false detection of the abnormal event can be inhibited by outputting a variable set extracted as an abnormal set if a value obtained by dividing the number of variable sets matching the variable set extracted as the abnormal set by the total number of third variable sets is larger than a predetermined value.

The case where the divided value is larger than a predetermined value is substantially synonymous with that similarity among variables in multiple abnormal sets is higher than the predetermined value. That is, it can be considered that the multiple abnormal sets form a group including variable values similar to each other, and therefore, they can be considered as non-noise-induced abnormal sets. The information processing device 1 inhibits output of a noise-induced abnormal set by implementing the above step S8.

As described above, according to this embodiment, a noise-induced abnormal set can be outputted by inhibiting output of a noise-induced abnormal set. Consequently, false detection of the abnormal event due to a noise-induced abnormal set can be inhibited.

Next, reason for calculating the expected value illustrated in FIG. 7 is described. Hereinafter, assume that in the past record set, most of records are records not related to a predetermined event of the detection target, and few records are records related to the predetermined event of the detection target. Hereinafter, a combination on one-variable-value to one-type basis is referred to as a single set, as appropriate.

That is, assume that most of single sets in the past record set (for example, 99.99%) are normal sets, and very few single sets in the past record set (for example, 0.01%) are non-noise-induced abnormal sets. The normal set includes a single set not being an abnormal set, and a noise-induced abnormal set.

Based on this assumption, the information processing device 1 according to this embodiment compares records of the past record set T1 and the current record set T2 to each other to determine whether a single set in the current record set is an abnormal set.

Assume a device (hereinafter, referred to as a detection device) which detects a predetermined event through a process different from that of the information processing device 1 according to this embodiment. The detection device calculates an expected value at which a single set will appear in the current record set, based on, for example, an appearance ratio at which the single set actually has appeared in the past record set.

Then, the detection device calculates out the absolute value of the difference between the expected value and the number of records containing the single set in the current record set, and outputs the single set as the abnormal set when the difference is larger than a predetermined threshold.

Here, assume that the number of records (hereinafter, referred to as a record X1) containing the single set [IP1&U1&A] in the past record set is 30. The records X1 containing single sets (number of records: 30) are records obtained by 30 times access to the URL "W" by the user "B" just for the purpose of getting points as mentioned above. Therefore, a single set contained in the records X1 is a non-noise-induced abnormal set.

Then, assume that the number of records (hereinafter, referred to as a record X2) containing the single set [IP1&U1&A] in the current record set is 1. The records X2 containing single sets (number of records: 1) are records obtained by 1 time access to the URL "U1" by the user "B" for the purpose of, for example, purchasing a commodity. Therefore, a single set contained in the records X2 is a normal set.

Here, the detection device multiplies a ratio between the total number of records in the past record set and the total number of records in the current record set by the number of appearances of the single set in the past record set to calculate out an expected value at which the single set will appear in the current record set.

Here, assume that the total number of records in the past record set is 20,000, and the total number of records in the current record set is 10,000. Then, assume that the number of appearances of the single set [IP1&U1&A] in the past record set is 30. Then, the expected value at which the single set [IP1&U1&A] will appear in the current record set is, for example, 15(30×(10000/20000)). Then, assume that a threshold for the single set [IP1&U1&A] is "5".

Then, the detection device calculates the difference "14" between the expected value "15" and the number of records X2 "1". Since the difference is larger than the threshold mentioned above, the detection device extracts the single set as an abnormal set. However, since the single set contained in the records X2 is a normal set, this extraction is a false extraction. As a result of the false extraction, this single set is outputted as an abnormal set, and thereby increases false detection of abnormal events.

That is, when a group of abnormal sets exists in the past record set T1, a single set in the group of abnormal sets may be outputted as a non-noise-induced abnormal set in spite that the single set is a normal set in the current record set T2.

To reduce such false extraction, it is preferable to calculate the expected value in an appropriate manner. However, it is difficult to calculate out the expected value appropriately just with an expected value of a single set obtained by multiplying a ratio between the total number of records in the past record set and the total number of records in the current record set by the number of appearances of the single set in the past record set.

Especially, unlike the above assumption, such false extraction frequently occurs when much more (for example, 1%) but not very few (for example, 0.01%) single sets in the past record set are abnormal sets due to some reason, as mentioned above.

The inventor has found out that such false extraction can be reduced by calculating an expected value with less effects of the group of abnormal sets in the past record set.

The inventor recognized that the number of variable values of each type in the abnormal set included in the past record set is very small compared with the number of variable values of the type in the past record set. Assume that this abnormal set is, for example, [IP2&U2&A]. Then, assume that the variable value of a certain type in this abnormal set is, for example, "U2". Further, assume that the variable value of the type in the past record set is, for example, "U1" to "U20". As seen from the above, the number (1) of the variable value (for example, "U2") of the type in the abnormal set included in the past record set is very small compared with the number (20) of variable values (for example, "U1" to "U20") of the type in the past record set.

Then, the inventor found that it is effective to perform the below process in order to calculate an expected value less affected by the group of abnormal sets in the past record set. That is, as illustrated in FIG. 7, the appearance ratios of the variable values of the respective types contained in variable sets (first variable set) selected at step S3 of FIG. 6 are multiplied, and the multiplied value is multiplied by the total number of records in the current record set T2 to calculate an expected value of the first variable set. According to the calculation processing, the expected value can be calculated in an appropriate manner, and thereby false extraction of the abnormal set can be inhibited.

Calculation of Threshold

Figure 9:
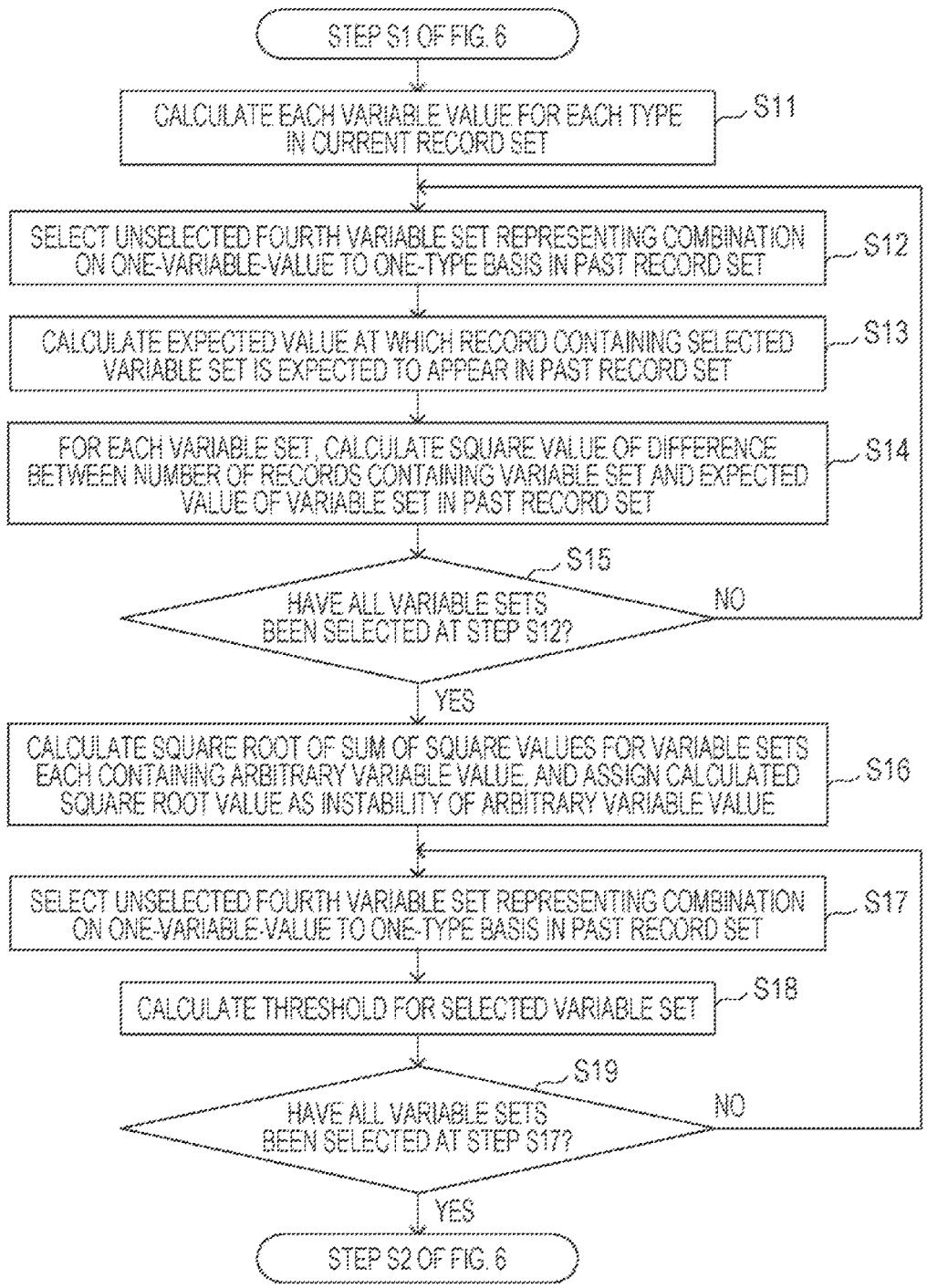
FIG. 9 is a flowchart for illustrating a process of calculating a threshold.

Reason for calculating the threshold for the first variable set representing the combination on one-variable-value to one-type basis in the current record set T2 illustrated in FIG. 9 and FIG. 10 is described.

As described in FIG. 6 to FIG. 8, when the absolute value of the difference between the total number of records including the first variable set in the current record set T2 and the expected value of the first variable set is larger than a threshold calculated in advance for the first variable set, the abnormal set extraction part 104 extracts selected variable sets as abnormal sets.

Here, the difference between the expected value of the first variable set representing the combination on one-variable-value to one-type basis in the past record set T1, and the number of appearances at which the first variable set actually appears in the current record set T2 varies for each of variable sets.

If the time slot for which records included in the past record set T1 and current record set T2 are set varies, the above difference for the same variable set varies depending on the time slot.

For example, assume that access destination URLs "U11" to "U15" (not shown) are URLs relating to a news site. Then, assume that an abnormal event is detected as illustrated in FIG. 6 to FIG. 8 based on access records (access logs) of accesses from an office to the news site.

Here, assume that an unspecified number of employees access the news site during a non-working hour time slot (for example, in the noon recess) other than the working hours of this office. In this case, various combinations of variable sets (large variation among the variable sets) appear in past and current record sets for the non-working hour time slot. Assume that when there is a large variation among variable sets, the probability that the number of noise-induced abnormal sets increases becomes high, since abnormal sets caused by an abnormal event prone to form a group containing variable values similar to each other (small variation among the variable sets).

In this assumption, even if the number of appearances at which the first variable set actually appears in the current record set T2 is far different from the expected value of the first variable set in the past record set T1 (i.e., even when the above difference is large), this variable set may be considered as not being the abnormal set.

On the other hand, assume that specific employees access the news site for business during the working hours of this office. In this case, a variation among variable sets in past and current record sets for the time slot of the working hours is small compared with the variation among the variable sets appearing in the time slot of the non-working hours. Assume that when there is a small variation among variable sets, the probability that the number of noise-induced abnormal sets increases becomes high, since abnormal sets caused by an abnormal event prone to form a group containing variable values similar to each other (small variation among the variable sets).

In this assumption, even if the number of appearances at which the first variable set actually appears in the current record set T2 is not far different from the expected value of the first variable set in the past record set T1 (i.e., even when the above difference is small this variable set may be considered as the abnormal set.

As described above, the difference between the expected value of the first variable set in the past record set T1, and the number of appearances at which the first variable set actually appears in the current record set T2 varies depending on a time slot. Nevertheless, when a same threshold is statically determined for each of variable sets, an appropriate abnormal set is not outputted. That is, false detection of the abnormal event occurs frequently.

Therefore, according to an aspect of this embodiment, the threshold is calculated for each variable set with reference to the past record set T1. According to this embodiment, a variable set is considered at a higher probability as a noise-induced variable set, as the difference between the expected value of the first variable set in the past record set T1, and the number of appearances at which the first variable set appears in the current record set T2 becomes larger. As the difference becomes larger, the threshold for the variable set is made bigger so as to inhibit a noise-induced variable set from being extracted as an abnormal set.

Process of calculating a predetermined threshold (step S1 of FIG. 6) is described with reference to FIG. 9 and FIG. 10. FIG. 9 is a flowchart for illustrating a process of calculating the threshold.

Step S11: The threshold calculation part 103 calculates the appearance ratio of variable values for each type in the past record set T1. The step S11 performs same processing as step S2 of FIG. 6.

Step S12: The threshold calculation part 103 selects an unselected fourth variable set representing the combination on one-variable-value to one-type basis in the past record set T1. The fourth variable set is synonymous with the first variable set. Processing of steps S12 to S19 is illustrated specifically in FIG. 10.

Step S13: The threshold calculation part 103 calculates an expected value at which the selected variable set is expected to appear in the past record set T1.

Step S14: The threshold calculation part 103 calculates, for each of variable sets, a square value of the difference between the total number of records including a variable set and expected value of variable set in the past record set T1 and the expected value of the variable set.

Step S15: The threshold calculation part 103 determines whether all variable sets have been selected at step S12. If all variable sets have not been selected (Step S15: No), the process returns to step S12. If all variable sets have been selected (Step S15: Yes), the process shifts to step S16.

Step S16: The threshold calculation part 103 calculates a square root of the sum of square values of variable sets containing an arbitrary variable value, and assign the calculated square root value as the instability of the arbitrary variable value. The arbitrary variable value is any of multiple variable values.

Step S17: The threshold calculation part 103 selects an unselected fourth variable set representing the combination on one-variable-value to one-type basis in the past record set T1.

Step S18: The threshold calculation part 103 calculates a threshold for the selected variable set.

Step S19: The threshold calculation part 103 determines whether all variable sets have been selected at step S17. If all variable sets have not been selected (Step S19: No), the process returns to step S17. If all variable sets have been selected (Step S19: Yes), the process shifts to step S2 of FIG. 6.

Specific Example of Process of Calculating Threshold

FIG. 10 is a diagram for specifically illustrating a process of calculating a threshold corresponding to the first variable set.

As illustrated in FIG. 7, the threshold calculation part 103 calculates the appearance ratio of each variable value described at step S2 of FIG. 6 (step S11): The threshold calculation part 103 may use the appearance ratio calculated by the expected value calculation part 102 as is.

The threshold calculation part 103 selects the fourth variable set representing the combination on one-variable-value to one-type basis in the past record set T1, and stores in the RAM 13 (step S12).

For example, variable types are IP address, URL and user. The threshold calculation part 103 selects any one of variable values of the variable type "IP address" (for example, IP1, IP2 . . . ) in the past record set T1. The threshold calculation part 103 selects any one of variable values of the variable type "URL" (for example, U1, U2 . . . ) in the past record set T1. The threshold calculation part 103 selects any one of variable values of the variable type "user" (for example, A, B . . . ) in the past record set T1.

Then, the threshold calculation part 103 combines the selected variable values for the respective types to form a fourth variable set representing the combination on one-variable-value to one-type basis. Examples of the fourth variable set include "IP1&U2&A", "IP2&U2&B", "IP1U1&B", and so on.

The threshold calculation part 103 stores the fourth variable set in the RAM 13, as shown in the past expected value table T51 of FIG. 10.

The threshold calculation part 103 implements the above combination for different variable values for each type in the past record set T1, and obtains all variable sets representing all combinations. For example, assume that in the past record set T1, there are two variable values IP1 and IP2 for the variable type "IP address", three variable values U1, U2 and U3 for the variable type "URL", and two variable values A and B for the variable value "user". In this case, all variable sets representing all combinations are 12(2×3×2) variable sets. The threshold calculation part 103 selects an unselected variable set out of all variable sets (step S12).

Calculation of Expected Value in Past Record Set T1

Next, calculation of the expected value in the past record set T1 (step S13 of FIG. 9) is described.

The threshold calculation part 103 multiplies the appearance ratios of variable values of the respective types contained in the variable set (fourth variable set) selected at step S12, multiplies the multiplied value by the total number of records in the past record set T1, and stores in the RAM 13 (step S13). The threshold calculation part 103 uses a value obtained by multiplying the multiplied value stored in the RAM 13 by the total number of records in the past record set T1, as an expected value at which the selected variable set is expected to appear in the past record set T1 (step S13).

In the above example, the total number of records in the past record set T1 is "20,000". The selected variable set is, for example, "IP1&U2&A". The appearance ratio of one variable value "IP1" of the type "IP address" in the variable set "IP1&U2&A" is "0.05" (see the IP appearance ratio table T21 of FIG. 7). The appearance ratio of one variable value "U1" of the type "URL" in the variable set "IP1&U2&A" is "0.10" (see the URL appearance ratio table T22 of FIG. 7). The appearance ratio of one variable value "A" of the type "user" in the variable set "IP1&U2&A" is "0.08" (see the user appearance ratio table T23 of FIG. 7).

The threshold calculation part 103 multiplies the appearance ratios "0.05", "0.10", and "0.08" for types "IP address", "URL", and "User" in the variable set "IP1&U2&A", multiplies the multiplied value (0.0004) by the total number of records in the past record set T1 "20,000", and calculates out the multiplied value "8.0" (20000×0.0004(0.05×0.10× 0.08)).

The threshold calculation part 103 uses the multiplied value "8.0" as an expected value "8.0" at which the variable set "IP1&U2&A" is expected to appear in the past record set T1.

The threshold calculation part 103 stores the variable set and the expected value of the variable set in association with each other in the RAM 13, as shown in the past expected value table T51 of FIG. 10.

Calculation of Square Value

Process of calculating, for each variable set, a square value of the difference between the total number of records including an arbitrary variable set and an expected value of the variable set in the past record set T1 is described (step S14 of FIG. 6). The total number of records including the arbitrary variable set is the frequency at which the arbitrary variable set appears in the past record set T1.

The threshold calculation part 103 calculates a difference between the number of records including the variable set selected in the past record set T1 at step S12, and an expected value of the selected variable set, and stores in the RAM 13 (step S14).

When the selected variable set is "IP1&U2&A", the expected value of the variable set is "8.0". Assume that in the past record set T1, the number of records containing the variable set "IP1&U2&A" (IP address "IP1", URL "U2", and user "A") is "4". In this case, the threshold calculation part 103 calculates the above difference "−4.0" (4-8.0) for the selected variable set "IP1&U2&A".

As shown in the square value calculation table T61 of FIG. 10, the threshold calculation part 103 stores, in the RAM 13, the variable set, the number of records containing the variable set in the past record set T1, and a difference between the number of records and the expected value of the variable set in association with each other. In the square value calculation table T61, the number of records containing the above variable set in the past record set T1 is shown as the number of appearances.

The threshold calculation part 103 calculates, for each of different variable sets (for the selected variable set), a square value of the difference between the number of records containing an arbitrary variable set (selected variable set) in the past record set T1, and an expected value of the variable set, and stores in the RAM 13 (step S14).

In the example of the square value calculation table T61 of FIG. 10, the number of records containing the variable set "IP1&U2&A" in the past record set T1 is "4", and the square value of the difference (−4.0(4-8)) between the number of records and the expected value (8.0) of the variable set is $16((-4.0)^2)$. The number of records containing the variable set "IP2&U2&B" in the past record set T1 is "6", and the square value of the difference between the number of records and the expected value (4.8) of the variable set is $1.44((1.2)^2)$.

The threshold calculation part 103 repeats processing of steps S12 to S14 until processing of steps S12 to S14 has completed (step S15: No) for variable sets representing all combinations on one-variable-value to one-type basis. The number of records containing the variable set "IP1&U1&B" in the past record set T1 is "0", and the square value of the difference between the number of records and the expected value (9.0) of the variable set is $81((0-9)^2)$. The number of records containing the variable set "IP1&U1C" in the past record set T1 is "1", and the square value of the difference between the number of records and the expected value (2.0) of the variable set is $1((1-2.0)^2)$.

Then, after this processing ends (step S15: Yes), the threshold calculation part 103 shifts to step S16. As described in step S14, the threshold calculation part 103 calculates, for each of different fourth variable sets, the square value of the difference between the frequency (number of appearances) when the fourth variable set representing the combination on one-variable-value to one-type basis in the past record set T1 appears in the past record set T1, and an expected value for appearance of the fourth variable set in the past record set T1. Fourth variable sets for each of the fourth variable sets are, for example, "IP1&U2&A", "IP1&U1&B", and "IP1&U1&C", shown in the square value calculation table T61 of FIG. 10.

Calculation of Instability

The threshold calculation part 103 calculates a square root of the sum of square values of variable sets containing an arbitrary variable value, and stores the calculated square root value as the stability of the arbitrary variable value in the RAM 13 in association with the arbitrary variable value (step S16).

For example, assume the IP address "IP1" as the arbitrary variable value. Then, assume that variable sets containing the IP address "IP1" are "IP1&U2&A", "IP1&U1&B", and "IP1&U1&C" shown in the square value calculation table T61 of FIG. 10. The square value of the variable set "IP1&U2&A" is "16", the square value of the variable set "IP1&U1&B" is "81", and the square value of the variable set "IP1&U1&C" is "1".

Accordingly, the threshold calculation part 103 calculates out, for example, the sum of square values "98" (16+81+1) for each of different variable sets including the IP address "IP1" which is the arbitrary variable value. Then, the threshold calculation part 103 stores the square root value "9.9" ($(98)^{1/2}$) of the sum "98" as the instability of the IP address "IP1" being the arbitrary variable value in the RAM 13 in association with the arbitrary variable value (step S16).

The IP address instability table T71 of FIG. 10 is a table for storing variable values of the IP address, and the instability of the variable values in association with each other. The URL instability table T72 is a table for storing variable values of the URL, and the instability of the variable values in association with each other. The user instability table T73 is a table for storing variable values of the user, and the instability of the variable values in association with each other.

The threshold calculation part 103 selects a fourth variable set representing the combination on one-variable-value to one-type basis in the past record set T1, and stores in the RAM 13 (step S17). Description of step S17 is omitted as being same processing as step S12.

Calculation of Threshold

The threshold calculation part 103 multiplies the instabilities of variable values of the respective types in the variable set selected at step S17 and stores in the RAM 13 (step S18). The threshold calculation part 103 multiplies the multiplied value by the total number of records in the current record set T2, and uses the multiplied value multiplied by a constant as a threshold corresponding to the variable set (step S18).

In the above example, the total number of records in the current record set T2 is "10,000". A variable set of the above combination is, for example, "IP1&U2&A". The instability of one variable value "IP1" of the type "IP address" in the variable set "IP1&U2&A" is "9.9" (see IP address instability table T71 of FIG. 10). The instability of one variable value "U2" of the type "URL" in the variable set "IP1&U2&A" is "9.0" (see URL instability table T72 of FIG. 10). The instability of one variable value "A" of the type "user" in the variable set "IP1&U2&A" is "3.1" (see user instability table T73 of FIG. 10).

The threshold calculation part 103 multiplies the instability "9.9" of the type IP address "IP1" in the variable set "IP1&U2&A", the instability "9.0" of the URL "U2", and the instability "3.1" of the user "A". The threshold calculation part 103 multiplies the multiplied value (276.21) by the total number of records in the current record set T2 "10,000", and further multiplies the obtained result "276.21×10,000" by a constant such as $10^{-6}$ to obtain "2.8". The value of the constant is a value predetermined by the administrator of the information processing device 1.

The threshold calculation part 103 uses the multiplied value "2.8" as the threshold "2.8" corresponding to the above variable set "IP1&U2&A".

The threshold calculation part 103 stores the variable set and the threshold for the variable set in association with each other in the RAM 13, as shown in the threshold table T81 of FIG. 10.

The threshold calculation part 103 repeats processing of steps S17 and S18 until processing of step S18 has completed (step S19: No) for variable sets representing all combinations on one-variable-value to one-type basis in the past record set T1.

Then, after this processing ends (step S19: Yes), the threshold calculation part 103 shifts to step S2 of FIG. 6. Hereafter, the information processing device 1 extracts the abnormal set by referring to the calculated threshold (steps S2 to S8 of FIG. 6).

As described at step S18, the threshold calculation part 103 calculates the square root value (instability) of the sum of the square value for a fourth variable set containing variable values in the first variable set, for each variable value of each type in the first variable set. The square root value calculated for each variable value of each type in the first variable set is the instability for each of the variable values mentioned above. Then, the threshold calculation part 103 multiplies the square root values of the variable values for the respective types in the first variable set and calculates a threshold for the first variable set based on the multiplied value. Here, the threshold calculation part 103 calculates the multiplied value multiplied by a constant (for example, $10^{-6}$) as a threshold for the first variable set.

The information processing device according to this embodiment dynamically calculates a different threshold for each of variable sets according to the content of the past record set. Then, the abnormal set is extracted by referring to the threshold, and therefore an appropriate abnormal set can be outputted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device configured to be coupled to a server device, the information processing device comprising:
   a storage device; and
   a processor coupled to the storage device and configured to:
   obtain, from the server device, a first record set including a plurality of variables, the variables indicating a source and a destination of access to the server device from a plurality of terminal devices through a network,
   store the first record set in the storage device,
   count, for each of variable values of each of the variables, first appearance numbers in the first record sets,
   determine, for each of the variable values of each of the variables in the first record sets, a first appearance ratio by dividing the first appearance number by a first total records number included in the first record set,
   specify a plurality of sets of the variable values each of which is included in each of the plurality of variables, respectively,
   determine, for each of the plurality of sets of the variable values, a second appearance ratio by multiplying the first appearance ratio of each of the variable values included in each of the plurality of sets, respectively,
   determine, for each of the plurality of sets of the variable values, an expected appearance number by multiplying the second appearance ratio and a second total record number included in the second record set, respectively,
   after obtaining the first record set, obtain, from the server device, a second record set different from the first record set and including the plurality of variables,
   store the second record set in the storage device,
   count, for each of the plurality of sets of the variable values in the second record, a second appearance number, respectively,
   determine, for each of the plurality of sets of the variable values, a difference between the expected appearance number and the second appearance number, respectively,
   specify, from the plurality of sets of the variable values, one or more sets of which the difference is over a first threshold value determined for each of the plurality of sets of the variable values, as an error set,
   select, from each of the plurality of variables, one or more the variable values, and specify combination patterns of the selected one or more the variable values,
   determine a total pattern number of the specified combination patterns of the selected one or more the variable values, and
   when a value obtained by dividing a number of the sets of the variable values specified as an error set and included in the specified combination patterns by the total pattern number is over a second threshold value, output at least one of first information and second information as an indicator indicating a probability of improper access to the server device, the first information indicating the sets of the variable values which are specified as an error set and included in the specified combination patterns, and the second information indicating the specified combination patterns of the selected one or more the variable values.

2. The information processing device according to claim 1, wherein the source of the access indicates an address of a terminal device of the plurality of terminal devices.

3. The information processing device according to claim 2, wherein the destination of the access indicates a URL accessed by a terminal device of the plurality of terminal devices.

4. The information processing device according to claim 3, wherein the first information indicates mal access to the URL.

5. A non-transitory computer-readable storage medium that stores a program, the program configured to cause a computer to:
   obtain, from a server device, a first record set including a plurality of variables, the variables indicating a source and a destination of access to the server device from a plurality of terminal devices through a network,
   store the first record set in a storage device,
   count, for each of variable values of each of the variables, first appearance numbers in the first record sets,
   determine, for each of the variable values of each of the variables in the first record sets, a first appearance ratio by dividing the first appearance number by a first total records number included in the first record set,
   specify a plurality of sets of the variable values each of which is included in each of the plurality of variables, respectively,
   determine, for each of the plurality of sets of the variable values, a second appearance ratio by multiplying the first appearance ratio of each of the variable values included in each of the plurality of sets, respectively,
   determine, for each of the plurality of sets of the variable values, an expected appearance number by multiplying the second appearance ratio and a second total record number included in the second record set, respectively, after obtaining the first record set, obtain, from the server device, a second record set different from the first record set and including the plurality of variables, store the second record set in the storage device, count, for each of the plurality of sets of the variable values in the second record, a second appearance number, respectively, determine, for each of the plurality of sets of the variable values, a difference between the expected appearance number and the second appearance number, respectively, specify, from the plurality of sets of the variable values, one or more sets of which the difference is over a first threshold value determined for each of the plurality of sets of the variable values, as an error set, select, from each of the plurality of variables, one or more the variable values, and specify combination patterns of the selected one or more the variable values, determine a total pattern number of the specified combination patterns of the selected one or more the variable values, and when a value obtained by dividing a number of the sets of the variable values specified as an error set and included in the specified combination patterns by the total pattern number is over a second threshold value, output at least one of first information and second information as an indicator indicating a probability of improper access to the server device, the first information indicating the sets of the variable values which are specified as an error set and included in the specified combination patterns, and the second information indicating the specify combination patterns of the selected one or more the variable values.

6. The non-transitory computer-readable storage medium according to claim 5, wherein the source of the access indicates an address of a terminal device of the plurality of terminal devices.

7. The non-transitory computer-readable storage medium according to claim 6, wherein the destination of the access indicates a URL accessed by a terminal device of the plurality of terminal devices.

8. The non-transitory computer-readable storage medium according to claim 7, wherein the first information indicates mal access to the URL.

9. An information processing method comprising:

obtaining, from a server device, a first record set including a plurality of variables, the variables indicating a source and a destination of access to the server device from a plurality of terminal devices through a network;

storing the first record set in a storage device;

counting, for each of variable values of each of the variables, first appearance numbers in the first record sets;

determining, for each of the variable values of each of the variables in the first record sets, a first appearance ratio by dividing the first appearance number by a first total records number included in the first record set;

specifying a plurality of sets of the variable values each of which is included in each of the plurality of variables, respectively;

determining, for each of the plurality of sets of the variable values, a second appearance ratio by multiplying the first appearance ratio of each of the variable values included in each of the plurality of sets, respectively;

determining, for each of the plurality of sets of the variable values, an expected appearance number by multiplying the second appearance ratio and a second total record number included in the second record set, respectively;

after obtaining the first record set, obtaining, from the server device, a second record set different from the first record set and including the plurality of variables;

storing the second record set in the storage device;

counting, for each of the plurality of sets of the variable values in the second record, a second appearance number, respectively;

determining, for each of the plurality of sets of the variable values, a difference between the expected appearance number and the second appearance number, respectively;

specifying, from the plurality of sets of the variable values, one or more sets of which the difference is over a first threshold value determined for each of the plurality of sets of the variable values, as an error set;

selecting, from each of the plurality of variables, one or more the variable values, and specifying combination patterns of the selected one or more the variable values, determining a total pattern number of the specified combination patterns of the selected one or more the variable values; and when a value obtained by dividing a number of the sets of the variable values specified as an error set and included in the specified combination patterns by the total pattern number is over a second threshold value, outputting at least one of first information and second information as an indicator indicating a probability of improper access to the server device, the first information indicating the sets of the variable values which are specified as an error set and included in the specified combination patterns, and the second information indicating the specified combination patterns of the selected one or more the variable values.

10. The information processing method according to claim 9, wherein the source of the access indicates an address of a terminal device of the plurality of terminal devices.

11. The information processing method according to claim 10, wherein the destination of the access indicates a URL accessed by a terminal device of the plurality of terminal devices.

12. The information processing method according to claim 11, wherein the first information indicates mal access to the URL.

* * * * *